United States Patent
Johansson et al.

(10) Patent No.: US 9,497,312 B1
(45) Date of Patent: Nov. 15, 2016

(54) DYNAMIC UNLOCK MECHANISMS FOR MOBILE DEVICES

(71) Applicant: Amazon Technologies, Inc., Seattle, WA (US)

(72) Inventors: Jesper Mikael Johansson, Redmond, WA (US); Phivos Costas Aristides, Seattle, WA (US); Darren Ernest Canavor, Redmond, WA (US); Arnaud Marie Froment, San Jose, CA (US); Scott Donald Gregory, Issaquah, WA (US); Cory Adam Johnson, Seattle, WA (US); Chelsea Celest Krueger, Seattle, WA (US); Jon Arron McClintock, Seattle, WA (US); Vijay Rangarajan, Issaquah, WA (US); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/624,497

(22) Filed: Feb. 17, 2015

(51) Int. Cl.
*H04W 12/06* (2009.01)
*H04M 1/725* (2006.01)

(52) U.S. Cl.
CPC ..... *H04M 1/72577* (2013.01); *H04M 1/72522* (2013.01); *H04M 1/72572* (2013.01); *H04W 12/06* (2013.01)

(58) Field of Classification Search
CPC ... H04W 12/06; H04W 12/12; H04W 12/08; H04W 88/02; H04L 63/08; H04M 1/72577; H04M 1/72522; H04M 1/72572
See application file for complete search history.

(56) References Cited

U.S. PATENT DOCUMENTS

| | | | | |
|---|---|---|---|---|
| 2011/0141276 A1* | 6/2011 | Borghei | ............... | H04W 12/08 348/143 |
| 2012/0100824 A1* | 4/2012 | Michael | ................ | H04W 4/22 455/404.2 |
| 2014/0006347 A1* | 1/2014 | Qureshi | ................ | G06F 21/10 707/621 |
| 2014/0304505 A1* | 10/2014 | Dawson | ............. | G06F 21/6227 713/165 |
| 2014/0380425 A1* | 12/2014 | Lockett | ................. | H04L 63/20 726/4 |

* cited by examiner

*Primary Examiner* — Ted Wang
(74) *Attorney, Agent, or Firm* — Davis Wright Tremaine LLP

(57) ABSTRACT

An access control application for mobile devices is provided. The access control application may be configured to generate a set of security tasks based at least in part on information corresponding to a user's interactions with the mobile device. An unlock screen of the mobile device may be triggered and a security tasks from the generated set of security tasks may be displayed through a user interface of the mobile device. The user's response to the security tasks may be obtained and a confidence score may be calculated, based at least in part on the response. The access control application may then determine, based at least in part on the score and one or more attributes of the environment, whether to unlock the mobile device or prompt the user to provide an additional response to another security task.

20 Claims, 11 Drawing Sheets

DYNAMIC UNLOCK MECHANISMS FOR MOBILE DEVICES

BACKGROUND

The use of mobile computing device, such as smart phones and tablets, has greatly increased in recent years. These devices may maintain user account integrity and user security by requiring users to authenticate themselves to the mobile computing device using user credentials. For example, a particular mobile computing device may require a user to verify their identity by submitting the correct combination of user name and password. Furthermore, organizations may require entities of the organization to enter a user name and password combination to gain access to organizational resources.

Many current password-based authentication systems rely on the ability of the user to select their own password. However, users often do not choose strong passwords, and users often have difficulty remembering randomly-generated passwords. Furthermore, mobile computing device may often be used in public or insecure environments creating a risk of the user's password being exposed to an attacker. Due to these problems, user-selected passwords are often easily compromised by an attacker. To prevent user information from being easily compromised because of poor user-selected passwords, many authentication systems employ complexity requirements such as a minimum length of eight characters, at least one upper case character, at least one lower case character and at least one non-alphabetic character. However, the complexity requirements may be difficult to implement on a mobile computing device and reduce the ease-of-use provided by the mobile computing device. Additionally, even these complexity requirements may not prevent users from selecting weak passwords. Even when adding additional complexity requirements, users may inadvertently bypass the complexity requirements and select weak passwords. For instance, the user may select a keyboard pattern that appears randomly generated, but may be easily attacked and compromised using modern techniques.

BRIEF DESCRIPTION OF THE DRAWINGS

Various embodiments in accordance with the present disclosure will be described with reference to the drawings, in which.

DETAILED DESCRIPTION

Figure 1A:
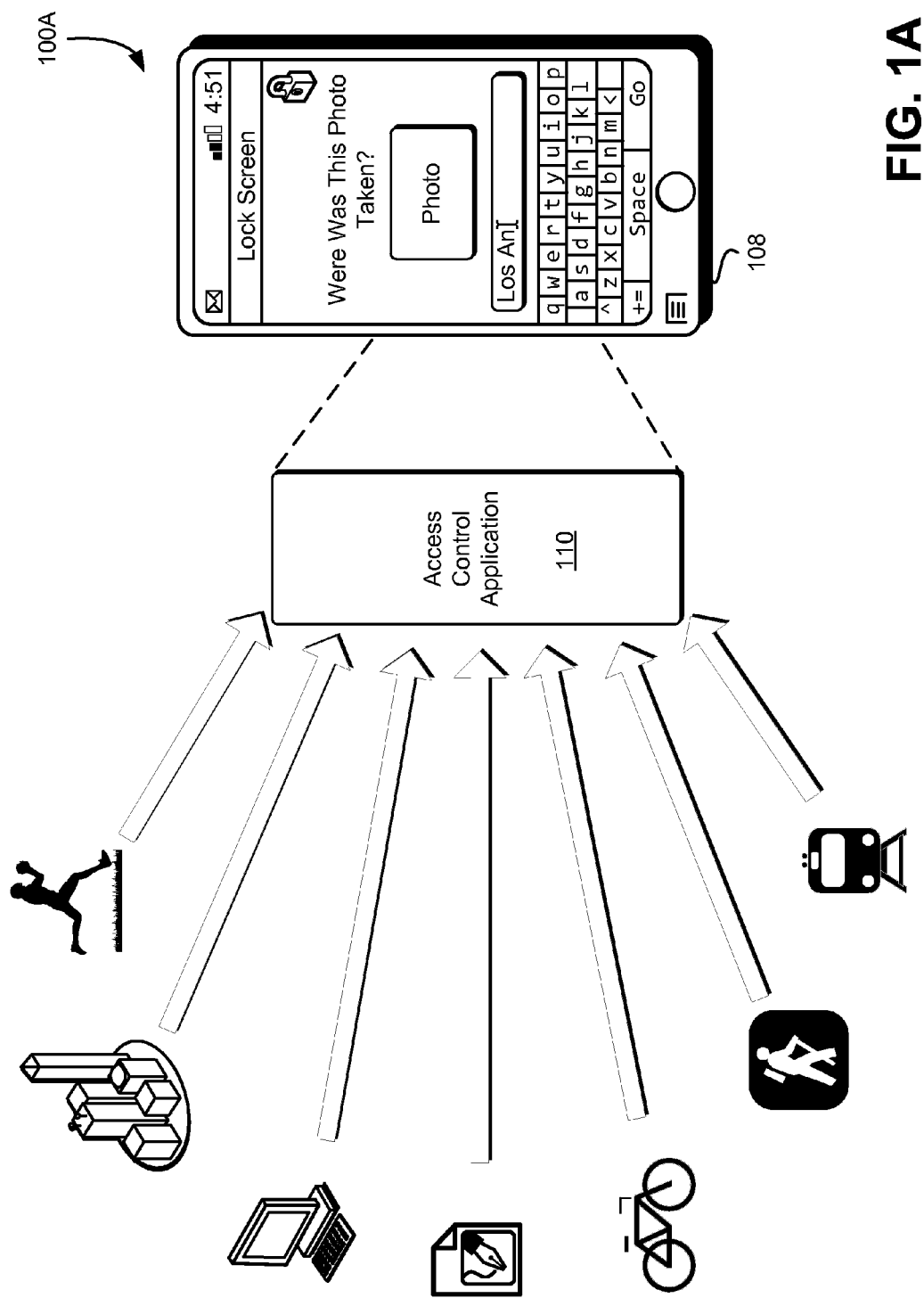
FIG. 1A is an environment illustrating a mobile device obtaining information corresponding to a user interaction with the mobile device in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements to password generation and password strength for mobile devices using user-specific information, including information corresponding to a user's interaction with a mobile device. The term "password" is used herein in the broad sense as information sufficient for gaining access, where the sufficiency of the information may be context dependent. A password, for example, may comprise a security task or set of security tasks derived from user-specific information and/or device-specific information. User-specific information may comprise a variety of information corresponding to the user such as user account information, user purchase history, user preferences, and other information associated with the user. The device-specific information may comprise a variety of information corresponding to the user interactions with the mobile device such as physical location of the device, application installed on the device, documents and images stored in device memory, information obtained from one or more sensors of the device, and other information corresponding to the user's interactions with the mobile device. The mobile device or a password management service operated by a computing resource service provider may generate a set of security tasks based at least in part on user specific and device-specific information.

For example, a security task may prompt the user to enter an application the user recently interacted with through an interface of the mobile device. In another example, the user may be prompted to place pictures taken by the mobile device into a determined order, such as chronologically based on a date the pictures were captured by a camera included in the mobile device. A screen with moveable items may be displayed on the mobile device. Unlocking the mobile device may require moving the items into the appropriate position on the screen presented by the mobile device. In various embodiments, the order in which the items are placed into position may not be considered for authentication purposes. For example, the user may simply be prompted to select only the images the user captured using a camera incorporated into the mobile device. The accuracy by which items displayed on the screen must be placed into the appropriate position on the screen may further be a configurable setting. In another example, passcode entry may require selection of multiple songs (e.g., on a wheel of possibilities), and selections of lyrics from the selected songs, where the songs are songs that are stored on the mobile device and/or that were played on the mobile device.

In various embodiments, the user may set a traditional alpha-numeric password during initialization of the mobile device. The mobile device may then collect information corresponding to the user's interaction with the device and generate a set of security tasks based at least in part on the collected information. In addition, the computing resource service provider may collect from the device, the device-specific information as described above. The computing resource service provider may generate a set of security tasks including device-specific information as well as user-specific information. For example, the set of security tasks generated by the computing resource service provider may include questions corresponding to the user's purchase history as well as questions corresponding to the images captured by the user's mobile device. Furthermore, the computing resource service provider may do additional processing of the information obtained from the mobile device, such as image processing, optical character Recognition (OCR), facial recognition, and other data processing. The computing resource service provider may provide the set of security tasks to the mobile device.

When the user attempts to unlock the mobile device (i.e., provide user input into a user input device of the mobile device to cause the mobile device to enter a state where additional functionality is accessible), the mobile device may select a security task from the set of security tasks and attempt to obtain information corresponding to the environment of the mobile device suitable for selection and/or generating additional security tasks. For example, the mobile device may attempt to obtain Global Positioning System (GPS) coordinates in order to determine the current location of the mobile device. The mobile device may obtain a response to the security task from the user and calculate a confidence score based at least in part on the obtained response. The confidence score may indicate a confidence or probability that the response was provided by the user of the mobile device. The mobile device may then determine whether to prompt the user for additional information (e.g., prompt the user to answer another security tasks) or unlock the mobile device based at least in part on the response and the obtained information corresponding to the environment of the mobile device. Furthermore, the responses provided by the user may be used to refine the set of security tasks. For example, a particular user may have difficulty recognizing images and may incorrectly answer security tasks involving images. As a result of the user incorrectly answering the security task involving images, the mobile device or computing resource service provider may adjust the set of security tasks such that the user is presented with security tasks involving images less frequently than other types of security tasks.

FIG. 1A illustrates an example environment 100A where a mobile device 108 may obtain information corresponding to a user's interaction with the mobile device, the obtained information may be used to generate a set of security tasks. The set of security tasks may be used to provide challenges to the user of the mobile device, the correct responses to which may enable the user to unlock the mobile device. Mobile devices utilize a variety of security features in order to protect the mobile device and the user's sensitive data stored in memory of the mobile device. For example, a lock screen may prevent unauthorized users from accessing the mobile device. The lock screen may be a user interface element utilized by various operating systems of mobile devices. The lock screens may regulate immediate access to a mobile device by requiring that the user perform a certain action in order to receive access such as entering a password, using a certain button combination, or by performing a certain gesture using a touchscreen or other interface of the mobile device. In various embodiments, the lock screen of the mobile device may provide at least some functionality beyond unlocking the phone. For example, the lock screen may enable the user to receive notifications, display a date and time, provide shortcuts to certain applications, capture images, obtain information for one or more sensors of the mobile device, or other functionality. Generally, techniques of the present disclosure are applicable to changes of state where additional functionality is accessible as a result of a user demonstrating, through user input, information sufficient for making such additional functionality accessible.

The mobile device 108 may be operating in accordance with a corresponding operating system such as a version of an Android® operating system, a Windows® phone operating system or an Apple® iOS operating system, although the techniques of the present disclosure are not limited to those operating systems discussed explicitly herein. The mobile device 108 may be the computing device described below in connection with FIG. 9, or may be a computing device incorporating components of the device described above in connection with FIG. 9. For example, the mobile device may be a smartphone or tablet computing device, although the techniques described in connection with FIG. 1 are not limited to such devices. As described in greater detail below, the mobile device may include a variety of sensors such as GPS sensors, cameras, and accelerometers. The various sensors may be used to collect information corresponding to the user interactions with the mobile device 108.

The mobile device 108 may obtain information suitable for generating the set of security tasks from a variety of different locations. An access control application 110 or operating system of the mobile device may obtain information from memory of the phone or other applications implemented by the mobile device. For example, the access control application 110 may determine the most recent movie ticket the user caused to be stored or interacted with by the mobile device. In another example, the access control application 110 may determine how far the user ran during the day based at least in part on information obtained from an accelerometer connected to the mobile device. In yet another example, the access control application may determine a time the user went to sleep or woke up. The access control application may poll other applications on the mobile device in order to obtain information about the user and/or information about the user's interactions with the mobile device. Using this information, the access control application may dynamically generate security tasks.

Furthermore, the access control application, using the obtained information, may automatically rotate the security tasks based at least in part on the obtained information changing. Returning to the examples above, the user may go to sleep or wake up at different times each day or may run different distances each day. The obtained information may include applications recently installed and/or removed from the mobile device. The access control application may be configured to collect information corresponding to the user from various data streams and/or locations such as the recent history of applications executed by the mobile device or background process executed by the mobile device. The access control application may be configured to communicate with and obtain information from other applications of the mobile device. In yet other embodiments, the other applications of the mobile device publish the information to the operating system of the mobile device or directly to the access control application. The user may select information and/or applications to allow the access control application to collect information. In various embodiments, the access control application collects information from other devices connected to the mobile device such as wearable devices, Bluetooth® enabled devices, wearable fitness devices, and other devices. The access control application may collect biometric information corresponding to the user, such as blood pressure and heart rate. In some embodiments, the access control application differentiates between different users of the mobile device and obtains user interaction information for the different users independently.

Figure 1B:
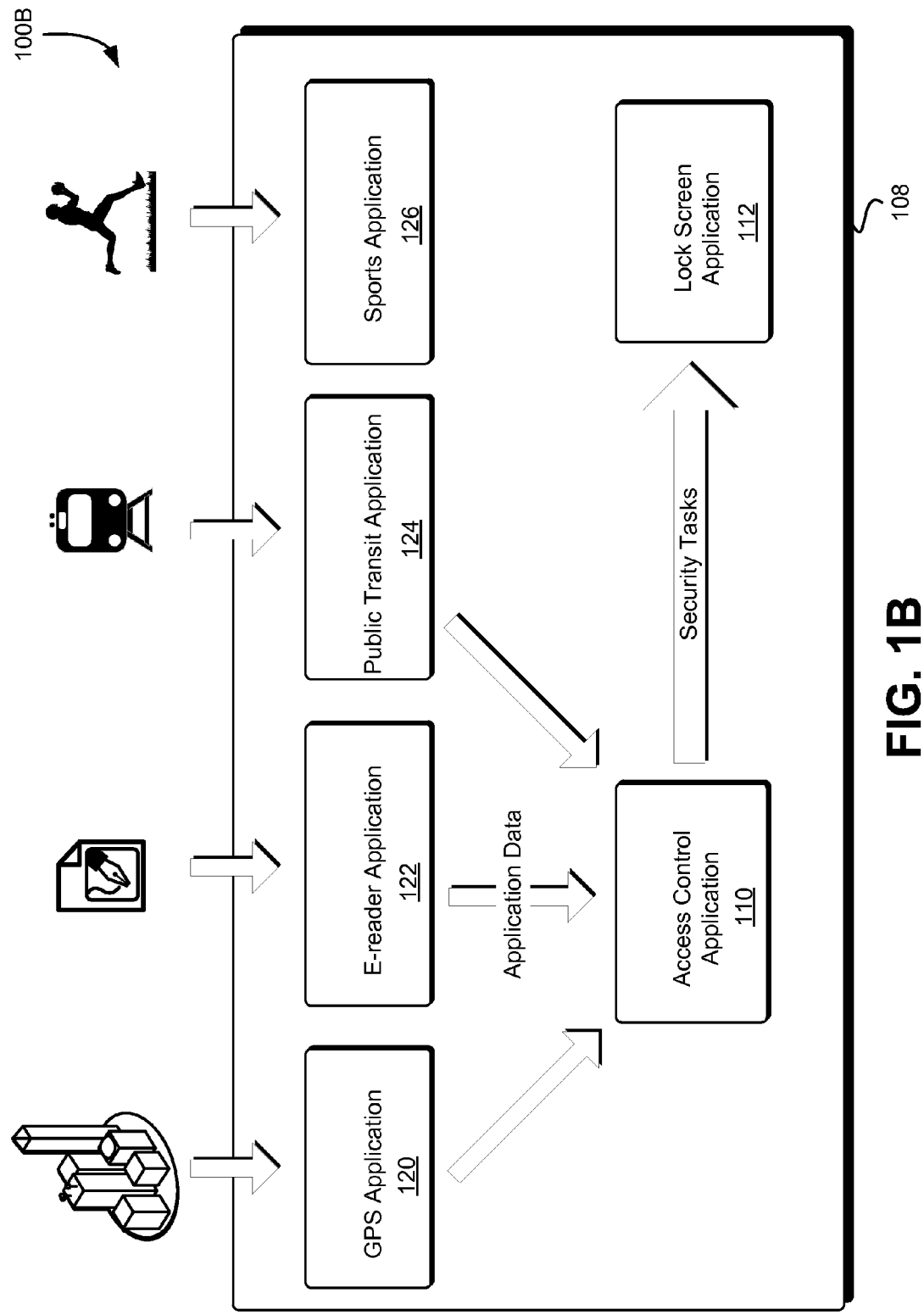
FIG. 1B is an environment illustrating a mobile device obtaining information corresponding to a user interaction with the mobile device in accordance with an embodiment.

FIG. 1B illustrates an example environment 100B where a mobile device 108 may obtain information corresponding to a user's interaction with applications implemented by the mobile device, the obtained information may be used to generate a set of security tasks. The security tasks may be generated by an access control application 110 as described above. The access control application 110 may collect information from various application implemented by the mobile device 108 such as a GPS application 120, electronic book reader application 122, public transit application 124, or sports application 126. The various applications may provide features and information to the user of the mobile device 108, as well as allow the user to interact with the mobile device 108 and the various applications. For example, the sports application may cause news and sports scores to be displayed on an output device of the mobile device 108, as well as allow the user to select various news articles to read. The various applications may interact with the mobile device 108 and the access control application through an operating system of the mobile device 108. For example, the GPS application 120 may obtain positioning information from a GPS sensor and other sensors of the mobile device 108. Additionally, the access control application may obtain information from the GPS application 120 by requesting the information from the operating system of the mobile device 108 or directly from the GPS application 120. For example, the access control application 120 may request the latest GPS coordinates directly from the GPS application 120 by submitting an API request or other request for the information to the GPS application 120.

In various embodiments, the access control application 110 is implemented by a computing resource service provider and security tasks are provided to the mobile device 108 based at least in part on the interaction information obtained from the various applications implemented by the mobile device. In yet other embodiments, the access control application is at least partially implemented by the mobile device 108 and the computing resource service provider. For example, the service provider may determine at least a portion of the set of security tasks and provide the access control application 110 implemented on the mobile device 108 with the portion of the set of security tasks. The access control application 110 implemented on the mobile device 108 may then determine additional security task or information to include in the security tasks. For example, the service provider may determine a particular question to include in a security task, such as "Where was your latest photo taken?" and the access control application 110 implemented the mobile device 108 may obtain the information from a camera application of the mobile device 108 in order to complete the security task Additionally the access control application 110 may have access to a set of resources different from the set of resources the various applications have access to. For example, the GPS application 120 may have access to the GPS sensor of the mobile device, however the access control application may not have direct access to the GPS sensor data but may obtain information from the GPS application 120 collected from the GPS sensor. Furthermore, the access control application may have a set of privileges that are different from the set of privileges of the various applications. For example, the access control application may be able to obtain information and access to the operating system or other application of the mobile device 108 that the various applications may not be able to obtain. For example, the access control application may have the privilege to set a security task, modify security settings, or modify the lock screen behavior of an operating system implemented by the mobile device 108. However the various applications may not be able to adjust the lock screen behavior of the operating system implemented by mobile device 108.

Figure 2:
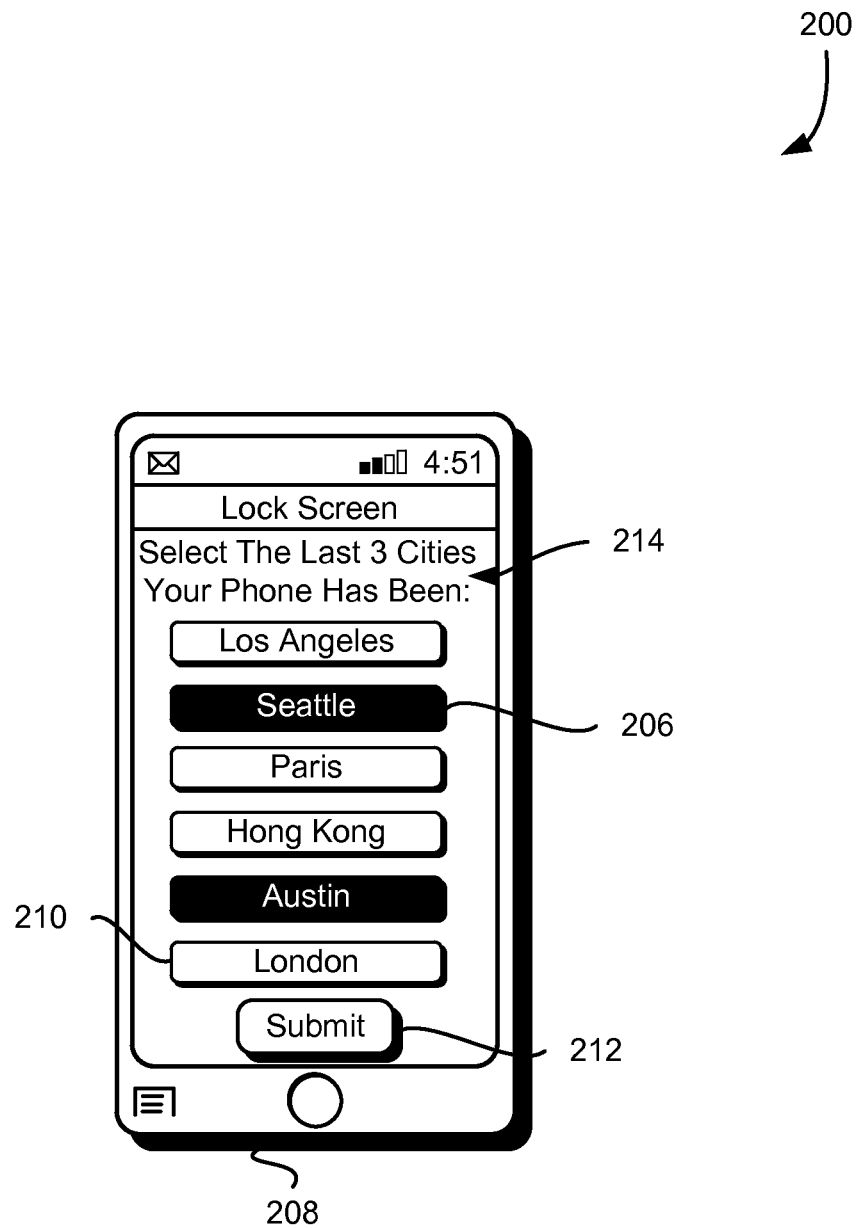
FIG. 2 is a diagram illustrating a mobile device lock screen utilizing information corresponding to a user interaction with the mobile device in accordance with an embodiment.

FIG. 2 illustrates an example environment 200 where a mobile device 208, as well as the associated code running thereon, may prompt a user for a response 206 to a security task 214 generated based at least in part on information corresponding to the user's interactions with the mobile device. The mobile device 208 may include an access control application, as described above. The access control application may be configured to obtain information suitable for generating a set of security tasks, selecting security tasks to display to the user, determining if the user has provided the correct response, and adjusting the set of security tasks based at least in part on the user's responses. Furthermore, the user may be able to rate at least a subset of the security task. For example, the user may be able to indicate an approval level for a particular security task. The user ratings may be used to adjust the set of security questions. In various embodiments, the user can skip a particular task and this information may be used as a rating of the particular security task that was skipped. The access control application may be a stand-alone application or may be an application of a computing resource service provider or other entity. The access control application, in an embodiment, is a computer system (i.e., collection of computing resources) configured to perform operations involved in authentication of users and generation of security tasks. For instance, the computing resource service provider or other entity may obtain information from the mobile device 208 and information corresponding to the user and generate a set of security tasks. The security tasks may then be provided to the mobile device and used for authenticating the user, as described in greater detail below.

The security tasks may prompt the user to provide a variety of different information suitable for authenticating a user and/or that the user is familiar with the mobile device 208. The access control application may prompt the user for the response 206 by providing a user interface, such as a lock screen as described above, of mobile device 208 with a security task 214. When the mobile device 208 is in a lock state, the mobile device 208 may respond to a limited set of user inputs, including input that corresponds to an attempt to activate the display, to transition the mobile device 208 to a user-interface unlock state, or to power the computing device off. However, a processor of mobile device 208 may take no other action in response to any user input (e.g., attempts to navigate between user interfaces). Even if the processor ignores a user input while in the user-interface lock state, the processor may still provide sensory feedback (such as visual, audio, or vibration feedback) to the user upon detection of the input to indicate that the input will be ignored and may perform other functionality (e.g., play music while in user-interface lock state). The user-interface lock state thus prevents unauthorized or inadvertent access to the mobile device 208. For example, while in the user-interface lock state, the mobile device 208 may not accept any other input until a particular touch gesture input is received. Receiving a particular touch gesture input may confirm that the user intends to access the mobile device 208 and that the touches are not accidental touches that occurred while the computing device is in a user's pocket or purse. In addition to preventing inadvertent access, the user-interface lock state may prevent unauthorized access to the mobile device 208. For example, while in the user-interface lock state, access to personal data on the mobile device 208 may be prevented. While in the user-interface lock state, an input may be received to authenticate the user and, in response to the authenticated input, the mobile device 208 may be unlocked. The input may, for example, be a touch gesture that the user has previously set for authentication purposes.

The security task 214 may be a question directed to the user of the mobile device 208, such as "Select the last 3 cities your phone has been." The security tasks 214 may be provided for a variety of different reasons; for example, the user of the mobile device 208 may be attempting to wake the mobile device 208 from a secure state or a power saving state. In another example, the user, through an input device of the mobile device, may attempt to access a restricted computing resource of the mobile device 208 or the computing resource service provider. The mobile device 208 may validate the response 206 to the security tasks 214 after the user has selected the submit button 212. The submit button may be a user interface element of the mobile device 208 or operating system of the mobile device 208 configured to cause the access control application to validate the response 206 inputted by the user.

In various embodiments, the mobile device 208 provides the response 206 to the password management service of the computing resource service provider. The response 206 information may be a collection of information, such as a collection of responses 206 to various security tasks 214, forming an authentication claim that is necessary and/or sufficient for authentication to a system for which authentication is required for at least some access. As an illustrative example, the response may be an encoding of one or more responses 206 and possibly other information, such as location information corresponding to the mobile device 208, necessary and/or sufficient for authentication. Furthermore, encoded responses may be provided over a communications network such as the Internet. The user may provide the responses 206 using a variety of different computing devices or combination of computing devices, including the mobile device 208 as shown in FIG. 1. For example, the user may provide the response 206 using the mobile device 208 and a GPS based navigation system.

The user may utilize an application and/or interface of the computing device in order to provide the response 206, as described above. As illustrated by FIG. 2, for example, the mobile device may include a touchscreen on which the user may select responses 206, such as a city name 210. Although the responses 206 comprising city names 210 is shown in FIG. 1, a variety of different responses 206 to security tasks 214 may be used in accordance with the present disclosure. For example, the security task 214 may ask the user to select pictures in an order determined by the user. In another example, the security task 214 may ask the user to place an image of a person in the correct location in another image from which the person was removed.

Returning to FIG. 2, in an embodiment, the mobile device 208 uses one or more sensors to collect information usable in generating the set of security tasks by the access control application implemented by the mobile device or the password management service implemented by the computing resource service provider. The mobile device 208 may be the computing device described below in connection with FIG. 9, or may be a computing device incorporating components of the device described above in connection with FIG. 9. For example, the mobile device may be a smartphone or tablet computing device, although the techniques described in connection with FIG. 2 are not limited to such devices. Furthermore, the mobile device 208 may include one or more cameras, the cameras may include a flash or other light emitting device such as a light emitting diode (LED). The cameras may be configured to capture information during execution of one or more operations utilizing the mobile device 208. For example, the cameras may be configured to capture an image of the user while the user is providing the response 206 using an input device of the mobile device, such as the keyboard described above.

Figure 3:
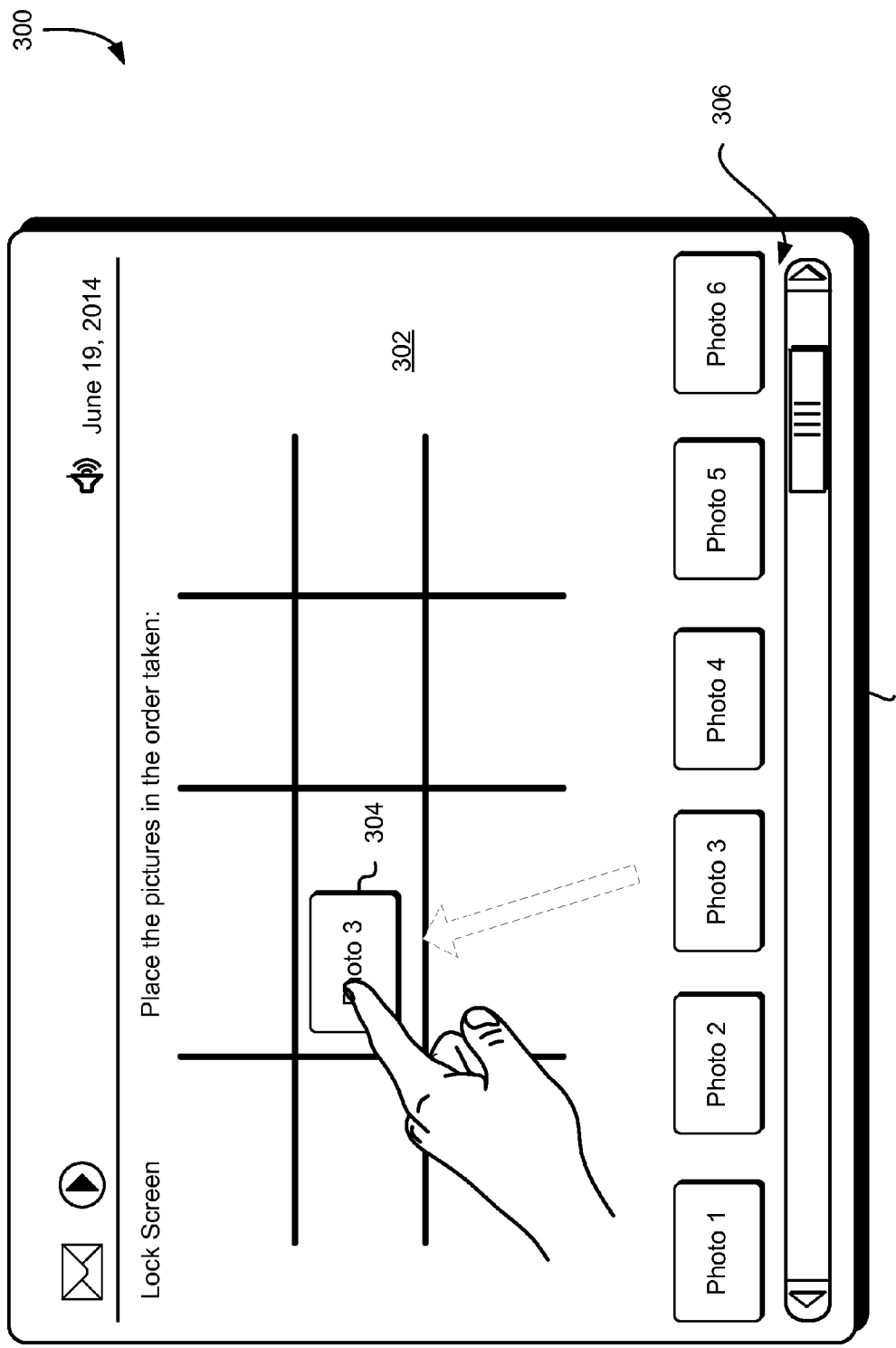
FIG. 3 is a diagram illustrating a mobile device lock screen utilizing information corresponding to a user interaction with the mobile device in accordance with an embodiment.

As discussed, various embodiments of the present disclosure provide for authentication based at least in part on information corresponding to a user of a computing device and/or the user's interaction with the computing device. FIG. 3 accordingly shows an illustrative example of a variation of the techniques described herein in accordance with various embodiments. In particular, FIG. 3 shows a display device 300, which displays a user interface 302. The user interface 302 may be a lock screen, as described above, or may be another screen such as a login screen. The display device may be, for example, a computer monitor of a notebook or personal computer, a display of a mobile device, a display of a tablet computing device, or otherwise a display of a computing device. In an embodiment, the user interface 302 is provided by an operating system of a computing device causing the user interface 302 to be displayed when authentication of the user is required by the computing device or application implemented by the computing device. In the particular example illustrated in FIG. 3, a display of various images 304 are displayed on the user interface 302. The images 304 may be, for example, images captured by the computing device or other device, icon or graphical representations of application, images created by the user using, images previous selected by the user, or any other images suitable for including in a security task.

In this particular example, the user interface 302 includes a 4 by 3 grid with locations for the user to place the images 304. As illustrated by FIG. 3, the images 304 may be arranged near the bottom of the user interface 302 and a scroll bar positioned under the images 304 enabling the user to navigate between images 304 and select the appropriate image 304. The order in which the user must place the images 304 in the grid may be predefined or may be determined based at least in part on a time at which the images 304 were generated. Additionally, the user may be required to place the images 304 in a particular location in the grid corresponding to the order, for example, the top left grid position may be the position for the first image according to the order of the images 304. In yet other embodiments, the placement of the images 304 in the grid does not correspond to the order of the images 304. For example, the user may be required to place the images 304 in order to correctly answer the security task, but the user may be able to place the images in any open location in the grid given that the selected image is the next image in the order. The images 304 may be thumbnail versions of photos captured by a photo application of the computing device 300.

The computing device or a password management service implemented by a computing resource service provider may remove images 304 from the set of possible images 304 that may be used in generating the security tasks based at least in part on security risk associated with the image. For example, a particular image may contain a recognizable landmark in the background, the image may be removed by the computing device because it may be easier for an attacker to guess the correct answer to a security task containing the particular image. Removing the images 304 may include removing the images 304 for a set of possible images that may be used to generate the security tasks. The computing device may utilize various image processing techniques to determine whether a particular image should be removed. For example, the computing device may perform OCR on the image to determine if the image contains any information useable in identifying the image. Additionally, metadata associated with the image may be used in determining whether to remove the image from the set of images 306 displayed by the user interface. Other techniques that may be used to determine whether to remove images 304 include facial recognition. For example, the computing device may utilize facial recognition to reduce the number of images containing the same person or people.

The user may also be able to remove images 304 from the set of images 306 that may be used in the security tasks. Furthermore, the computing device or password management service may determine one or more types of images 304 the user eliminates and eliminate images 304 of the same types. The password management service may collect information from a set of users in order to improve the selection of images 304. Furthermore, if the computing device 300 determines an attack may be occurring, the computing device 300 may cause the user interface 302 to display a security task to which the user will be unable to provide the correct response to and detect if the attempt to access the computing device is an attack based at least in part on a negative score calculated based at least in part on the response to the security task. For example, the security task may be configured to be answered correctly by an attacker mining the user's data that the user has had difficulty answering correctly in previous attempts. For example, previous attempts to authenticate the user may indicate that the user is more successful at answering security tasks comprising numbers than images. In various embodiments, the user may be able to skip a security task or select a new security task to be presented instead of answering the security task currently displayed by the user interface 302. Returning to the example above, trying to answer a security task by the attacker may be an indicator of an attack because the user in the past has skipped the particular type of security task displayed by the user interface 302. The computing device may determine a set of security tasks and/or scores for security tasks based at least in part on success rate of user response or difficulty of the security tasks.

Figure 4:
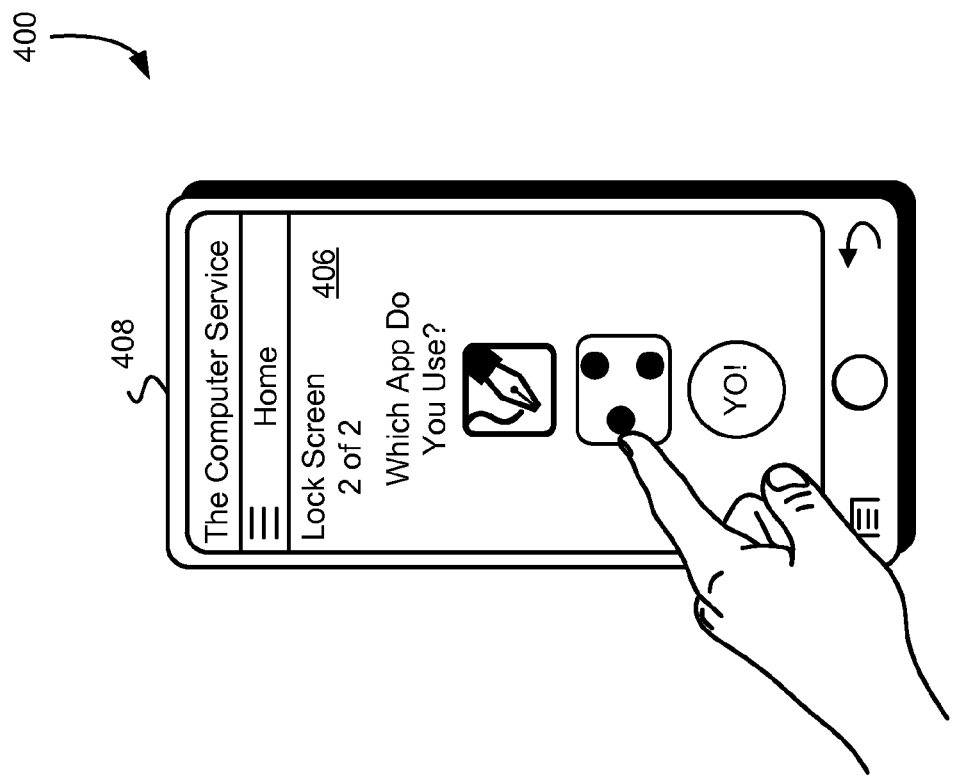
FIG. 4 is a diagram illustrating a mobile device lock screen utilizing information corresponding to a user interaction with the mobile device in accordance with an embodiment.
Figure 4:
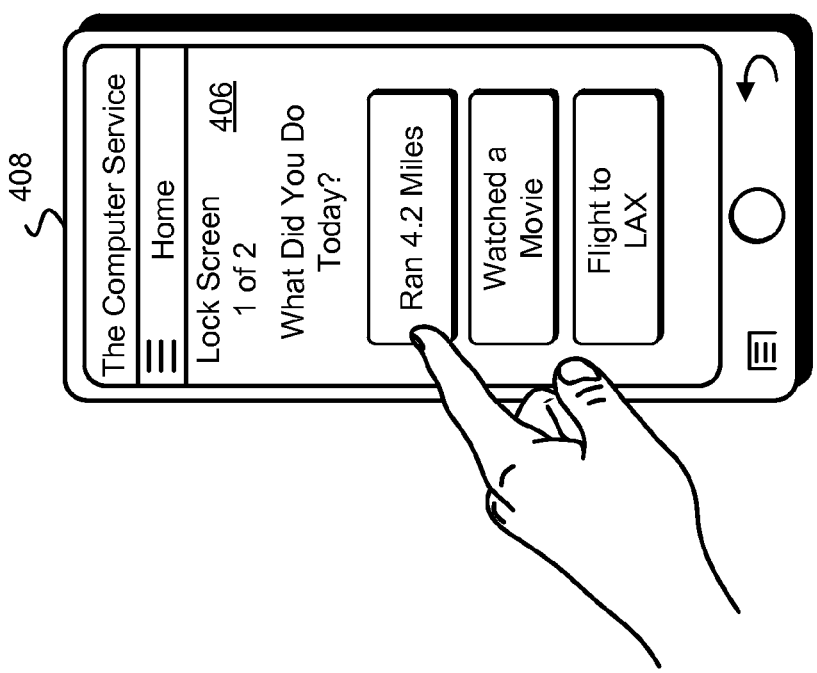

FIG. 4 illustrates an example environment 400 where a mobile device 408, as well as the associated code running thereon, may prompt a user for a response 406 to a security task generated based at least in part on information corresponding to the user's interactions with the mobile device. The mobile device 408 may include an access control application, as described above. The access control application may be configured to obtain information suitable for generating a set of security tasks, selecting security tasks to display to the user, determining if the user has provided the correct response, and adjusting the set of security tasks based at least in part on the user's responses. As illustrated by FIG. 4, the user may be guided by a user interface of the mobile device through several security tasks. For example, the user may be prompted to answer 7 security tasks in an interval of time. The mobile device 408 may require the user to provide the correct response to a certain number of security tasks based at least in part on the environment which the mobile device 408 is in. For example, if the mobile device 408 determines a set of GPS coordinates obtained by the mobile device corresponds to the user's home or place of business, the access control application of the mobile device may only require the user to answer 5 of the 7 security tasks correctly. Additionally, if the security task selected by the access control application has a lower complexity and/or difficulty than other security tasks, the access control application may require the user to provide correct responses to additional questions.

If the access control application determines that the mobile device 408 is not in a secure or recognized environment, the access control application may prompt the user for response to more security tasks or security tasks with a higher difficulty than other security tasks. For example, if the GPS coordinates indicate that the mobile device 408 is in Paris and the access control application determines that there is no information indicating that the user should be in Paris or that determine that there is information indicating that the user should not be in Paris, the access control application may increase the number and difficulty of the security tasks. The access control application may determine if the user has planned a trip to Paris based at least in part on information obtained from the mobile device or other computer systems, such as a computing resource service provider. For example, the access control application may obtain airplane boarding passes stored in memory of the mobile device, determine videos or books consumed by the user, calendar information, or other information indicating a possible location of the user. In various embodiments, the access control application maintains an alpha-numeric password created by the user which the access control application may prompt the user to provide for a variety of reasons.

Figure 5:
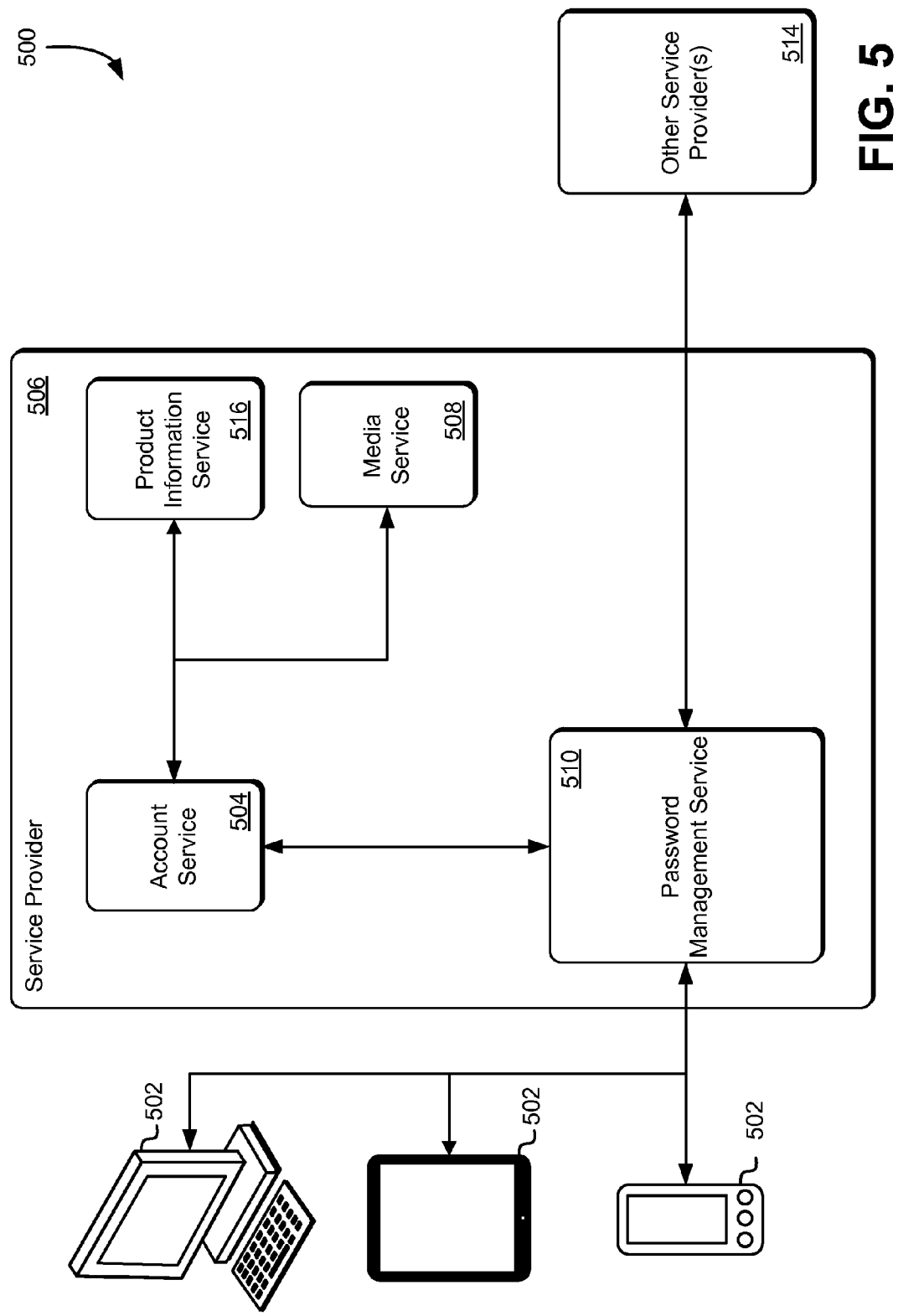
FIG. 5 is a diagram illustrating password management in accordance with an embodiment.

FIG. 5 shows an environment 500 in which an access control application or other application of a user device can connect to a computing resource service provider 506 in order to obtain a set of security tasks and/or provide user specific and device-specific information to a password management service 510 or one or more other services. The access control application can connect to the computing resource service provider 506 through one or more computing devices 502. The computing device 502 may include personal computers, smartphones, tablets, or any other computing device capable of connecting to computing resource service provider 506. The computing device may transmit data over a network to a password management service 510 operated by the computing resource service provider 506. In various embodiments, the password management service 510 validates user specific and device-specific information received from the computing devices 502. One or more other services of the computing resource service provider 506 may be responsible for obtaining user-specific information described above, such as the account service 504. The password management service 510 may also receive requests from the computing devices 502 or other service providers 514. Furthermore, users operating computing devices 502 may be directed to the password management service 510 for a variety of reasons including the user has created a new account, the user has purchased a particular device, the user has reset their user password a number of times within a certain period, the user had their password compromised a certain number of times, an administrator setting, an updated security policy or any other reason suitable for requiring a user to establish authentication information.

The password management service 510 may be a collection of computing resources collectively configured to generate a set of security tasks based at least in part on user-specific information and device-specific information and adjust the set of security tasks based at least in part on responses to security tasks provided by users. For example, the password management service 510 may be a computer system connected over a network to the computing devices 502 and one or more other computer systems in order to obtain information corresponding to the user's interactions with the computing devices 502. The password management service 510 may obtain from the computing devices 502 user responses to security tasks or user success rate at responding to particular security tasks. The obtained information may be used by the password management service 510 to calculate a score or scores for each security task. The score may indicate a likelihood of success that user will provide the correct response to the security tasks. The score may also incorporate the likelihood that an attacker will provide an incorrect response. The password management service 510 may then adjust the set of security tasks based at least in part on the calculated score. For example, the password management service may assign a weight to each security tasks or types of security tasks and adjust the weight based at least in part on the calculated score.

The different types of security tasks may be differentiated based at least in part on the type of information used to generate the security tasks and/or the type of information provided in responses. For example, image matching security tasks may ask the user to identify information corresponding to the image. Other types of security tasks may ask the user to identify a value, such has "how far did you run today" or "what did you pay for lunch." The password management service 510, as illustrated in FIG. 5, may obtain data from a variety of different devices operated by the user. The data obtained from the different devices may be included in the set of security tasks. Furthermore, the password management service 510 may obtain information corresponding to the security tasks that the user skipped. In various embodiments, the password management service 510 may provide a notification to the user through the computing devices 502 that an attacker is attempting to unlock the user's mobile device.

The password management service 510 may also communicate with one or more other services of the computing resource service provider 506 in order to obtain information corresponding to the user, or otherwise obtain information useable for generating the set of security tasks. For example, the password management service 510 may communicate with an account service 504, a product information service 516, a media service 508, or other service providers 514. The password management service 510 may obtain the user's purchase history from the account service 504. The password management service 510 may obtain the information corresponding to movies, videos, music, books, and other media consumed by the user from the media service 508. The product information service 516 may provide the password management service with information corresponding to games and applications installed, deleted, and used by the user. The password management service 510 may also obtain information corresponding to prior computing devices operated by the user.

The account service 504 may be a collection of computing resources collectively configured to maintain and manage information corresponding to user accounts, users, services and other information corresponding to users or the computing resource service provider 506. For example, the account service 504 may be a computer system responsible for maintaining user information such as user location, date of birth, name, address, contact information, credit card information, purchased products, favorite songs, favorite movies, or other information associated with users of the computing resource service provider 506. Information associated with the users may include performance reviews or other information about the actions of the users. The account service 504 may also receive requests from the password management service 510 for information corresponding to a particular user. For example, the password management service 510 may request additional information from the account service 504 corresponding to a particular user's library of media objects. The information may be used to generate a set of security tasks that may be provided to the user's mobile device in order to enable the mobile device to authenticate the user.

The account service 504 may also request information from one or more additional services. For example, the account service 504 may request product data and/or other product information from the product information service 516. The product information service 516 may collect information corresponding to goods or services offered for consumption on an electronic marketplace operated by the computing resource service provider 506. The product information service 516 may also store information corresponding to particular media objects particular users have consumed through the online marketplace. For example, the product information service 516 may store information corresponding to all songs a particular user has caused playback of, using computing device 502. Furthermore, the product information service 516 may collect indicators of a user's preference for media objects. For example, the user may increase the volume of a particular portion of a song during playback. The password management service 510 may use the information received from the product information service 516 to generate the set of security tasks as described above.

The media service 508 may be a collection of computing resources collectively configured to retrieve one or more media objects for use with the password management service 510 including text, audio, or video. The media service 508 may also contain one or more storage systems for storing media objects. The media service 508 may also provide the account service 504 or the password management service 510 with information corresponding to the media objects such as director, composer, genre, duration, performance, performer or any other information corresponding to the media object. The password management service 510 may generate the set of security tasks based at least in part on the information received from the media service 508 as described above. The password management service 510 may obtain and request information from the product information service 516 or the media service 508 directly or indirectly. Furthermore, the password management service 510 may receive from the computing device 502 additional information corresponding to the set of security tasks or additional actions to be performed during operation of the computing device 502. Additionally, the password management service 510 may transmit or receive information from one or more other service providers 514.

Figure 6:
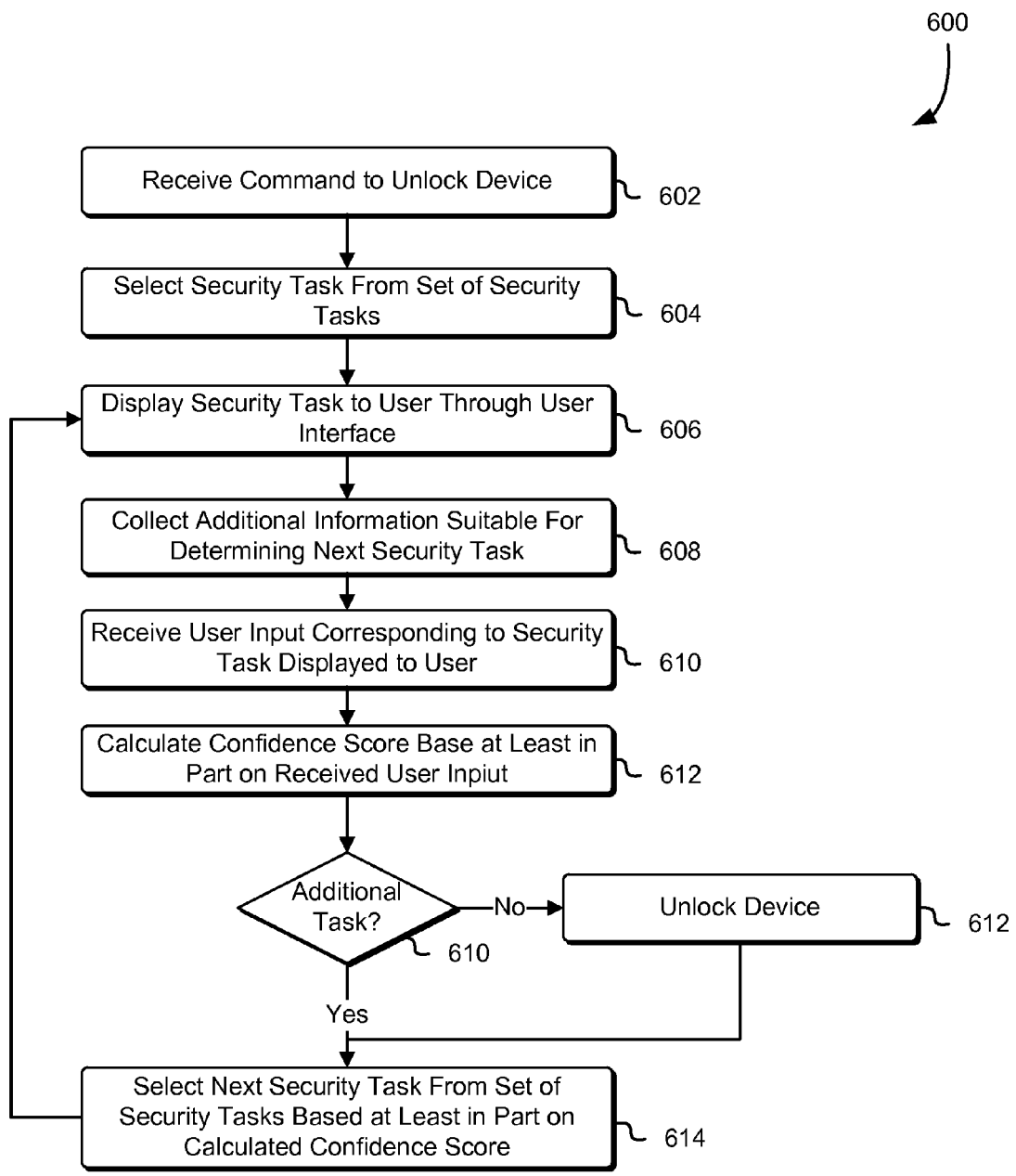
FIG. 6 illustrates an example process for authenticating a user to a mobile device in accordance with an embodiment.

FIG. 6 shows an illustrative example of the process 600 which may be used to authenticate a user and unlock a mobile device based at least in part on responses provided by the user to security tasks. The process 600 may be performed by any suitable system such as the mobile device and the access control application executed by the mobile device described above in connection with FIGS. 2-4. Returning to FIG. 6, in an embodiment, the process 600 includes receiving a command to unlock the mobile device 602. For example, the user may press a physical button on the mobile device or the mobile device may receive a command over a network. The mobile device may, in response to the command, select a security task from the set of security tasks 604. In numerous variations to the process 600, the mobile device may pre-select a security task prior to locking the device to be displayed the next time the device receives a command to unlock.

The mobile device may then display the selected security task to the user through a user interface of the mobile device 606. For example, the security task may be displayed as part of a lock screen as described above in connection with FIG. 3. The mobile device may then collect additional information suitable for determining the next security task 608. For example, the mobile device may determine environmental information such as a geographic location based at least in part on GPS coordinates obtained by the mobile device or a network detectable by the mobile device. Additional information may be used to determine the geographic location of the mobile device such as a zip code provided by the user, wireless networks detected by the mobile device including Bluetooth® and other near field communications networks detected by the mobile device, and any other information suitable for determining location. Furthermore, the mobile device may be configured to select different tasks based at least in part the environmental information. For example, the mobile device may select different task if the user operating the mobile device is in motion, such as jogging or driving. The selected security task may be easier for a user to complete while the mobile device is in motion. In numerous variations to the process 600, if the mobile device is unable to determine additional information, the access control application may prompt the user to answer additional security tasks in order to allow for more time to obtain the additional information. The mobile device may then obtain user input corresponding to the security task displayed to the user 610. The user may input a response to the security task using a keyboard, touchscreen, or other input device connected to the mobile device as described above in connection with FIG. 2.

The password applied may then calculate a confidence score based at least in part on the received user input 612. The confidence score may be an interval in which the access control application may determine to authenticate the user. The confidence score may include additional information such as the location of the mobile device. For example, if the mobile device determines the user is at home the confidence score may be increased. Additional scores may be calculated for a likelihood of user success and a score for how secure the security task is. Furthermore a weight maybe assigned for each type of security task (e.g., questions about pictures, numbers, places, or actions performed) and a weight will also be assigned for selection questions based at least in part on difficulty or likelihood of user success. The access control application may determine whether additional security tasks are required based at least in part on the confidence score 610. For example, if the GPS coordinates indicate the mobile device is in Hong Kong but a calendar application indicated that the user has a meeting in Seattle, the access control application may calculate a lower confidence score, despite a correct response to the security task, and determine additional security tasks are required. In numerous variations to the process 600, if the confidence score is below a threshold the access control application may prompt the user to provide the user alpha-numeric password.

If the access control application determines that no additional security tasks are required, the access control application may cause the mobile device to unlock 612. If the access control application determines that additional security tasks are required, the access control application may select the next security task from the set of security tasks based at least in part on the calculated confidence score 614. The access control application may update the set of security tasks, generate additional security tasks, and adjust the set of security tasks.

Figure 7:
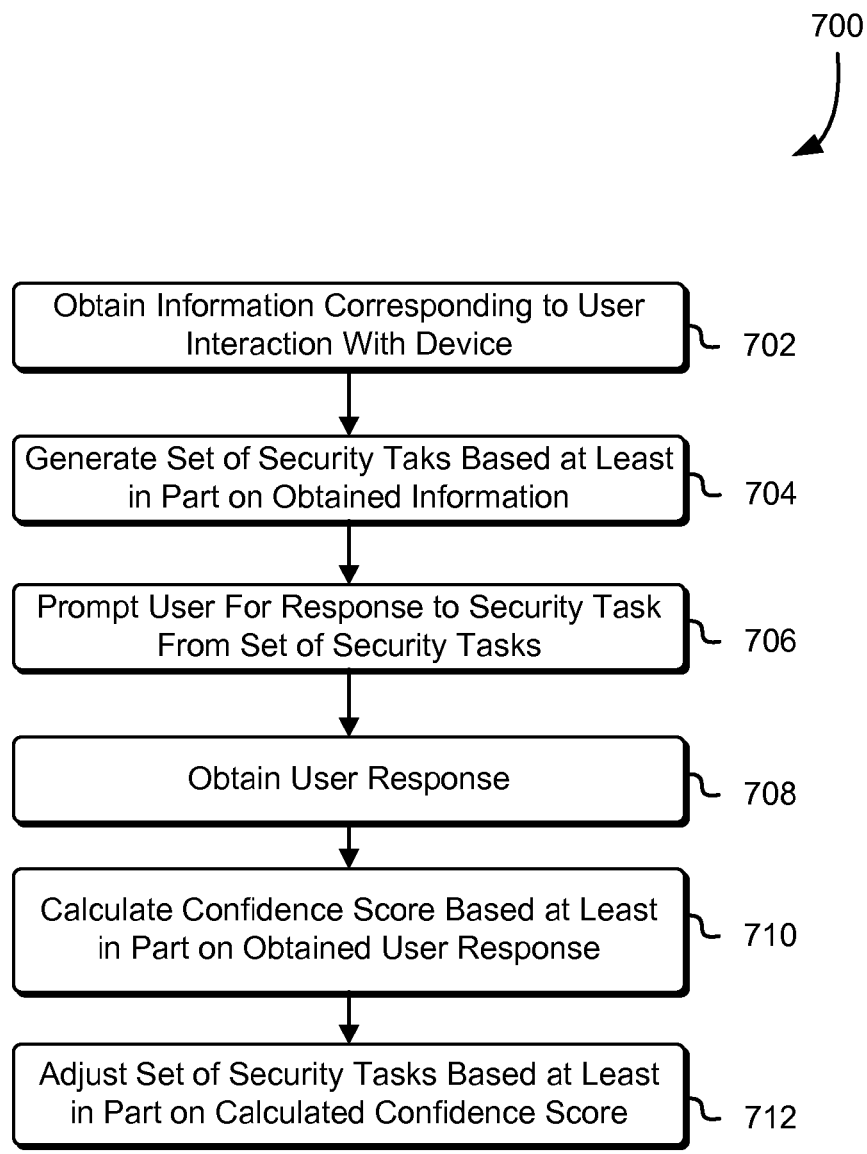
FIG. 7 illustrates an example process for generating a set of security tasks suitable for authenticating a user in accordance with an embodiment.

FIG. 7 shows an illustrative example of the process 700 which may be used to generate a set of security tasks and adjust the generated set of security tasks based at least in part on responses provided by the user to security tasks. The process 700 may be performed by any suitable system such as the mobile device and the access control application executed by the mobile device described above in connection with FIGS. 2-4. Returning to FIG. 7, in an embodiment, the process 700 includes obtaining information corresponding to user interaction with the mobile device 702. For example, the access control application may obtain information corresponding to applications executed by the user, such as the most recent level of a video game completed by the user. The access control application may obtain information for a variety of different applications including shopping applications, maps, communication applications (e.g., phone applications, SMS applications, e-mail applications), calendar, financial applications, productivity applications (e.g., document applications, spread sheets applications, presentation applications), social networking applications, education applications, banking applications, weather applications, news applications, music applications, video games, travel applications, food applications, and other applications executed by computing devices. The users may interact with the various applications executed by the computing device, such inputting a destination and obtaining turn by turn directions from a maps application executed by a car. Another example, of a user interaction with an application may include providing voice commands to a television or device connected to the television in order to tune the television to a particular channel or program. The access control application may obtain user interaction information from multiple application implemented by multiple computing devices. The access control application may then generate a set of security tasks based at least in part on the obtained information 704. For example, the access control application may generate a security task prompting the user to complete or provide the obtained information in a response, such as how many miles did you run today as illustrated above in connection with FIG. 4.

The access control application may then prompt the user for responses to security tasks from the set of security tasks 706. The access control application may, for example, prompt the user to provide responses as part of a training or initialization process of the access control application. The access control application may then obtain user responses to the security tasks 708. The responses may be obtained from an input device of the mobile device as described above.

Based at least in part on the obtained responses, the access control application may calculate a confidence score 710. As described above, the score may include a variety of factors and each factor may be weighted. For example, a score may be calculated based at least in part on the likelihood of success or ease of the user in answering particular security tasks or types of security tasks. The access control application may then adjust the set of security tasks based at least in part on the calculated score 712. For example, if the user skips the majority of the security tasks requiring the user to provide a numerical value, the access control application may lower the weight assigned to numerical value type security tasks or remove the security task involving numbers from the set of security tasks. Adjusting the set of security tasks may also include generating new security tasks. The new security tasks may be based on information previously obtained by the mobile device or may be based on information recently acquired by the mobile device.

Figure 8:
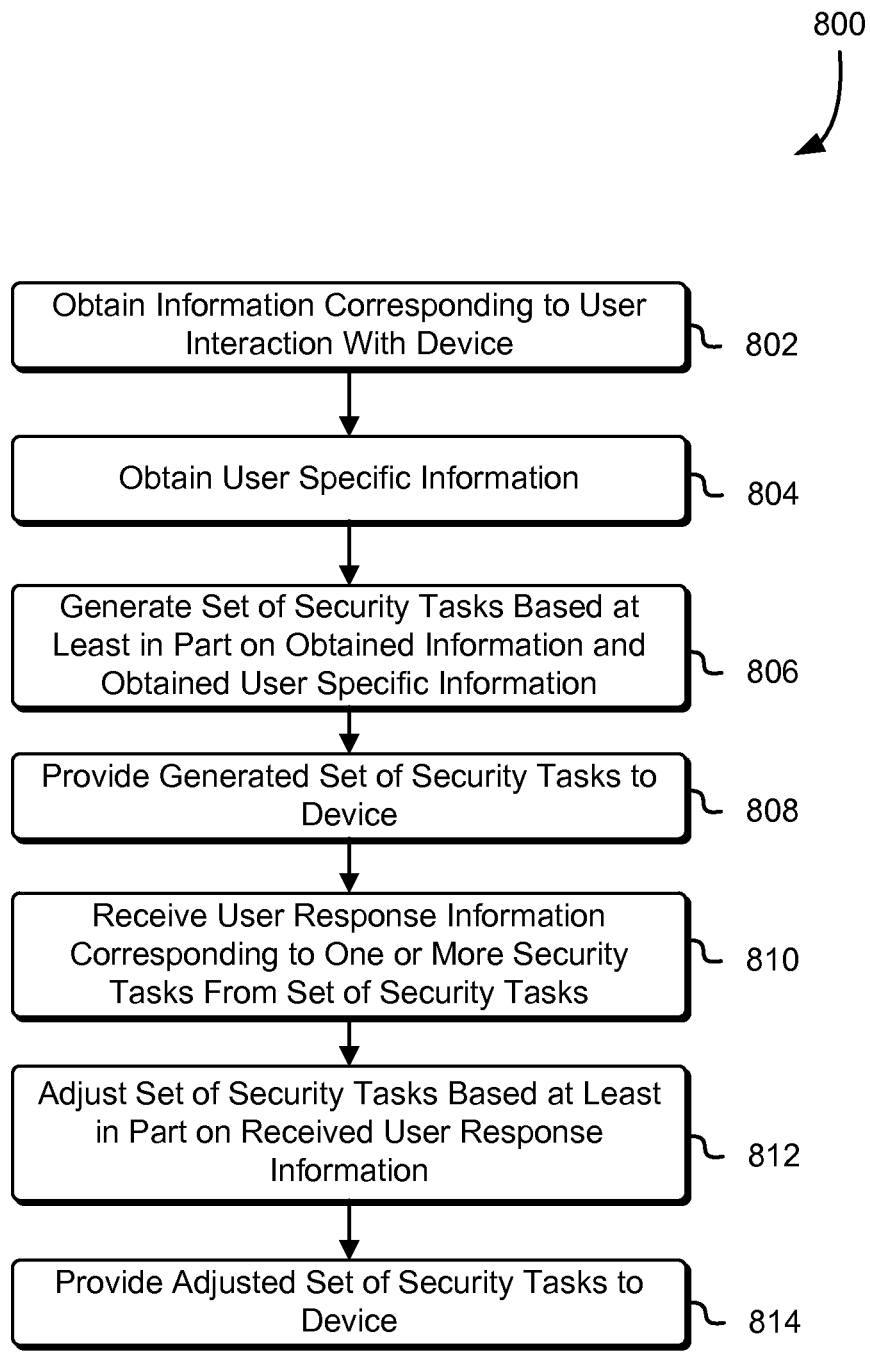
FIG. 8 illustrates an example process for generating a set of security tasks suitable for authenticating a user in accordance in accordance with an embodiment.

FIG. 8 shows an illustrative example of the process 800 which may be used to generate a set of security tasks useable by a mobile device to authenticate a user. The process 800 may be performed by any suitable system such as the password management service described above in connection with FIG. 5. Returning to FIG. 8, in an embodiment, the process 800 includes obtaining information corresponding to user interaction with the mobile device 802. For example, the password management service may obtain information for the mobile device such as geographic location or recently deleted applications. Additionally, the password management service may obtain user-specific information 804. User-specific information may include a user's purchase history or viewing history. In numerous variations to process 800, the password management may generate the set of security tasks solely on information obtained from the mobile device.

Once the password management service obtains information suitable for generating the set of security tasks, the password management service may generate the set of security tasks 806. The set of security tasks may be based at least in part on device-specific information and user-specific information. For example, the set of security tasks may include security tasks prompting the user to provide the 3 most recent purchases or the 3 most recent cities visited. The password management service may then provide the generated set of security tasks to the mobile device 808. The password management service may provide the set of security tasks to an access control application implemented by the mobile device as described above. The access control application may provide user responses to the security tasks obtained from the user to the password management service. For example, the access control application may, at the expiration of an interval of time, provide user responses to the password management service and receive additional security tasks from the password management service. The mobile device may be configured to store the set of security tasks.

The password management service may then receive user responses corresponding to one or more security tasks from the set of security tasks 810. The password management service may then calculate a score for the response and/or one or more security tasks as described above. The password management service may also adjust the set of security tasks based at least in part on the received user response information 812. For example, if the user continuously provides the incorrect response for a particular security task, the password management service may remove the question from the set of security tasks. The password management service may then provide the adjusted set of security tasks to the mobile device 814.

Figure 9:
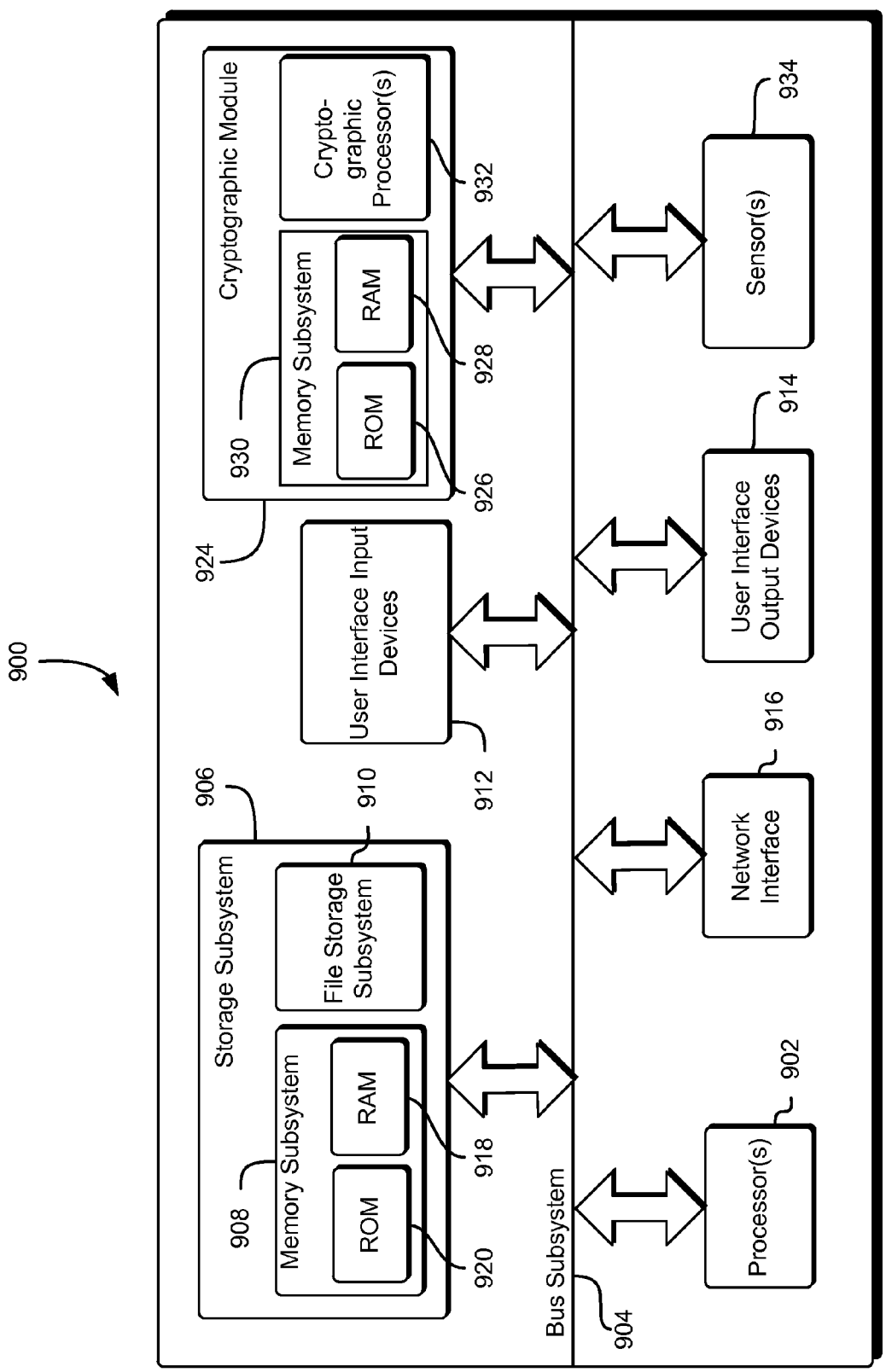
FIG. 9 shows an illustrative example of components of a computing device in accordance with at least one embodiment.

FIG. 9 is an illustrative, simplified block diagram of an example device system 900 that may be used to practice at least one embodiment of the present disclosure. In various embodiments, the device system 900 may be used to implement any of the systems illustrated herein and described above. For example, the device system 900 may be used to implement an access control application and other applications, such as a password management service, in accordance with various embodiments. As shown in FIG. 9, the device 900 may include one or more processors 902 that may be configured to communicate with and are operatively coupled to a number of peripheral subsystems via a bus subsystem 904. These peripheral subsystems may include a storage subsystem 906, comprising a memory subsystem 908 and a file storage subsystem 910, one or more user interface input devices 912, one or more user interface output devices 914, a network interface subsystem 916, a cryptographic module 924, comprising a memory subsystem 930 and one or more cryptographic processors 932. The peripheral subsystems may also include one or more sensors 934 in addition to sensors of input devices 912. Such sensors may include, but are not limited to, GPS sensors, accelerometers, temperature sensors and others.

The bus subsystem 904 may provide a mechanism for enabling the various components and subsystems of device system 900 to communicate with each other as intended. Although the bus subsystem 904 is shown schematically as a single bus, alternative embodiments of the bus subsystem may utilize multiple busses.

The network interface subsystem 916 may provide an interface to other device systems and networks. The network interface subsystem 916 may serve as an interface for receiving data from and transmitting data to other systems from the device system 900. For example, the network interface subsystem 916 may enable transmission of security tasks and other information, such as electronic requests to access a system (e.g., receive a webpage) and may enable receipt of responses to the requests, such as webpages or other information. The network interface subsystem 916 may also facilitate the receipt and/or transmission of data on other networks, such as an organization's intranet and/or other networks described below.

The user interface input devices 912 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in generating a security task, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 900.

User interface output devices 914, if any, may include a display subsystem, a printer or non-visual displays, such as audio and/or tactile output devices, etc. Generally, the output devices 914 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 900. The output device(s) 914 may be used, for example, to present user interfaces to facilitate user interaction with applications performing processes described herein and variations therein, when such interaction may be appropriate. While a device 900 with user interface output devices is used for the purpose of illustration, it should be noted that the device 900 may operate without an output device, such as when the device 900 is operated in a server rack and, during typical operation, an output device is not needed.

The storage subsystem 906 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 906. These application modules or instructions may be executed by the one or more processors 902. The storage subsystem 906 may additionally provide a repository for storing data used in accordance with the present disclosure. The storage subsystem 906 may comprise a memory subsystem 908 and a file/disk storage subsystem 910.

The cryptographic module 924, which may be a trusted platform module (TPM), includes a memory subsystem 930, including a main random access memory (RAM) 928 for storage of instructions and data during program execution and a read only memory (ROM) 926, in which fixed cryptographic information may be stored, such as a hardware secret stored securely within the device 900 so as to be non-exportable (i.e., inaccessible through any call to the cryptographic module 924). The cryptographic module 924, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 900 may also store cryptographic keys in RAM 928 and/or processor registers for temporary cryptographic processing. The cryptographic information stored in memory may be used in combination with cryptographic information obtained via the network interface 916 and/or one or more of the user interface input devices 912. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 924 may be configured to collectively perform various operations used generating cryptographically verifiable information for security tasks.

As noted above, in various embodiments of the present disclosure, hardware secrets are securely stored within the cryptographic module 924. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 10:
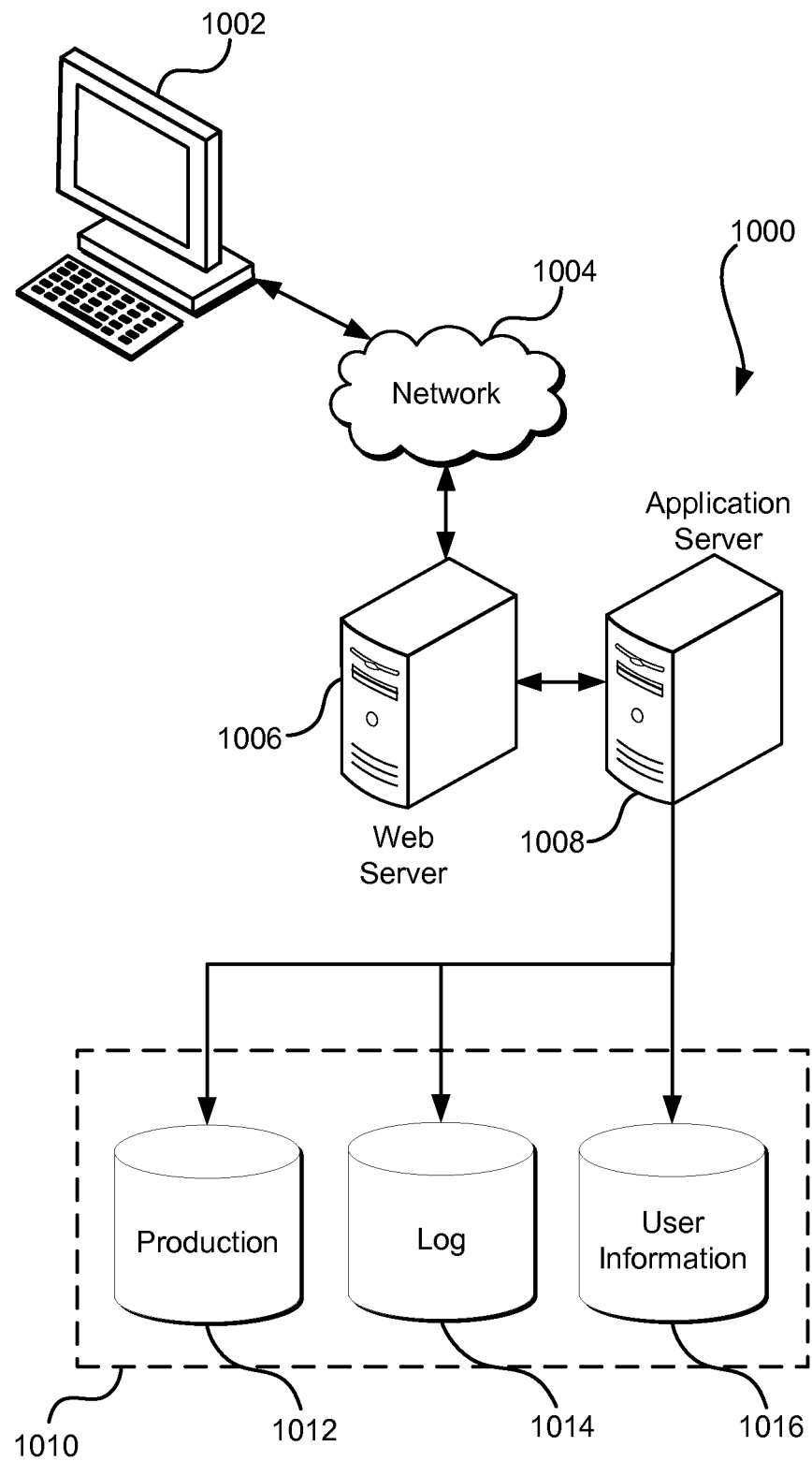
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for unlocking functionality of a mobile device, comprising:
    under the control of one or more computer systems with executable instructions,
        obtaining information corresponding to interactions with applications executed on a mobile device, the applications lacking privileges to set unlock settings of the mobile device;
        generating a set of security tasks based at least in part on the interactions;
        detecting a trigger for displaying a user interface for unlocking the mobile device;
        selecting a security task from the set of security tasks;
        displaying the selected security task through the user interface, where the user interface requires a response to the security tasks before enabling use of the mobile device;
        receiving a response to the displayed security task;
        calculating a confidence score based at least in part on the response;
        determining, based at least in part on the calculated confidence score, to require a next response to the next security tasks prior to enabling use of the mobile device;
        displaying the next security task through the user interface; and
        unlocking the mobile device as a result of determining the next security task was completed successfully.

2. The computer-implemented method of claim 1, wherein the computer-implemented method further includes adjusting the set of security tasks based at least in part on the received response and an ability of a user to provide a correct response to a security task of the set of security tasks.

3. The computer-implemented method of claim 1, wherein the applications executed on the mobile device include at least one of a photo capturing application, a calendar application, a social networking application, a mobile payments application, a web browsing application, an exercise tracking application, a contact list application, a mapping applications, or a messaging application.

4. The computer-implemented method of claim 1, wherein the computer-implemented method further includes:
    obtaining information corresponding to an environment of the mobile device, the information suitable for determine a next security task of the set of security tasks; and
    wherein determining, based at least in part on the obtained information corresponding to the environment and the calculated confidence score, to require a next response to the next security tasks prior to enabling use of the mobile device.

5. A system, comprising:
    at least one computing device including one or more processors; and
    memory that includes instructions that, as a result of execution by the one or more processors, cause the system to implement one or more applications, wherein the one or more applications include an access control application configured to:

obtain interaction information corresponding to a set of applications of which the access control application is not a member, the set of applications lacking privileges to set unlock settings of the at least one computing device and the access control application having privileges to modify the unlock settings of the at least one computing device;

generate, based at least in part on the obtained interaction information, a security task;

provide the generated security task to enable the security task to be completed;

detect an attempted solution to the security task; and if the attempted solution is correct, provide access to the functionality of the system.

6. The system of claim 5, wherein the one or more services are configured to obtain the interaction information by selecting, from a set of instances of content stored as a result of an interaction with an application of the set of applications, an instance of content.

7. The system of claim 5, wherein:
the one or more services are configured to obtain the interaction information by submitting a request for additional interaction information from another service operated by a service provider; and
the security task is further based at least in part on the additional interaction information.

8. The system of claim 5, wherein the one or more services are further configured to calculate a score for the attempted solution, the score comprising a set of weighted values indicating a likelihood of obtaining a successful response.

9. The system of claim 5, wherein the one or more services are further configured to adjust a type of the security task based at least in part on the attempted solution.

10. The system of claim 9, wherein the one or more services configured to adjust the security task are further configured to adjust a weighted value associated with the security task.

11. The system of claim 5, wherein the one or more services are further configured to:
generate a set of security tasks including the security task;
select the security task from the set of security tasks; and
load the security task into memory of the system such that as a result of a trigger being detected to unlock the system the security task will be presented.

12. The system of claim 5, wherein the one or more services are further configured to generate a set of security tasks based at least in part on the obtained interaction information.

13. A non-transitory computer-readable storage medium having stored thereon executable instructions for an access control application, the executable instructions as a result of execution by one or more processors of a computer system, cause the computer system to:

generate a set of security tasks based at least in part on interactions with a set of applications that does not include the access control application, the set of applications lacking privileges to set unlock settings of the computer system and the access control application containing the privileges to set the unlock settings of the computer system;

select, from the generated set of security tasks, a security task;

receive a proposed solution to the selected security task; and provide access to a resource if the proposed solution is correct.

14. The non-transitory computer-readable storage medium of claim 13, wherein:
the instructions further include instructions that, when executed by the one or more processors, cause the computer system to obtain environmental information corresponding to an environment in which the computer system is located; and
the security task is further selected based at least in part on the environmental information.

15. The non-transitory computer-readable storage medium of claim 14, wherein the instructions further comprise instructions that, when executed by the one or more processors, cause the computer system to correlate a geographic location with at least one other data value obtained from at least one of the one or more application in order to verify at least one of an environment of the computer system or a behavior of a user of the computer system prior to providing access to the resource.

16. The non-transitory computer-readable storage medium of claim 13, wherein the instructions further comprise instructions that, when executed by the one or more processors, cause the computer system to calculate a score for the received proposed solution, where the score indicates a confidence level that the proposed solution was provided by an authorized user.

17. The non-transitory computer-readable storage medium of claim 13, wherein the instructions further comprise instructions that, when executed by the one or more processors, cause the computer system to obtain information corresponding to user interaction with photo capturing application of the computer system.

18. The non-transitory computer-readable storage medium of claim 13, wherein the instructions further comprise instructions that, when executed by the one or more processors, cause the computer system to communicate with another computer system to obtain information corresponding to user interactions with application set of applications.

19. The non-transitory computer-readable storage medium of claim 13, wherein the instructions that cause the computer system to receive the proposed solution to the selected security task further include instructions that cause the computer system to require a user to provide information corresponding to at least one previous geographic location of the computer system.

20. The non-transitory computer-readable storage medium of claim 13, wherein the instructions that cause the computer system to receive the proposed solution to the selected security task further include instructions that cause the computer system to require a user to place a set of images in a defined order via an interface of the computer system.

* * * * *